B. W. SCOTT.
APPARATUS FOR THE MANUFACTURE OF CAPSULES.
APPLICATION FILED AUG. 29, 1910.

1,076,459.

Patented Oct. 21, 1913.
10 SHEETS—SHEET 1.

Witnesses
O. B. Baenziger.
J. G. Howlett.

Inventor
Burton W. Scott.
By
F. A. Wheeler, Attorney.

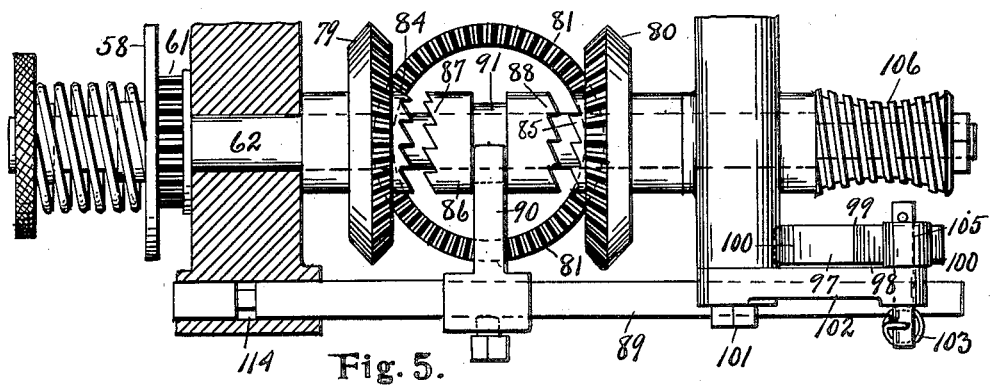
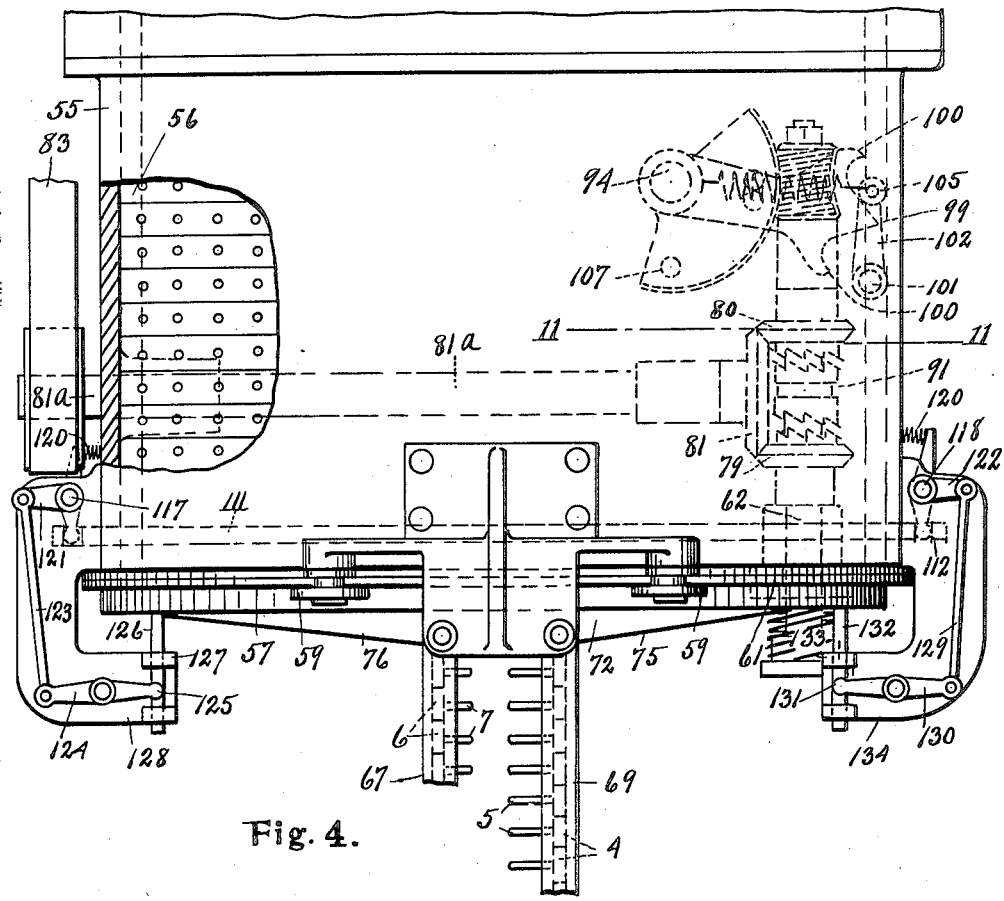

B. W. SCOTT.
APPARATUS FOR THE MANUFACTURE OF CAPSULES.
APPLICATION FILED AUG. 29, 1910.

1,076,459.

Patented Oct. 21, 1913.

10 SHEETS—SHEET 5.

Witnesses
O. B. Baenziger
J. L. Howlett

Inventor
Burton W. Scott
T. W. Wheeler, Attorney.

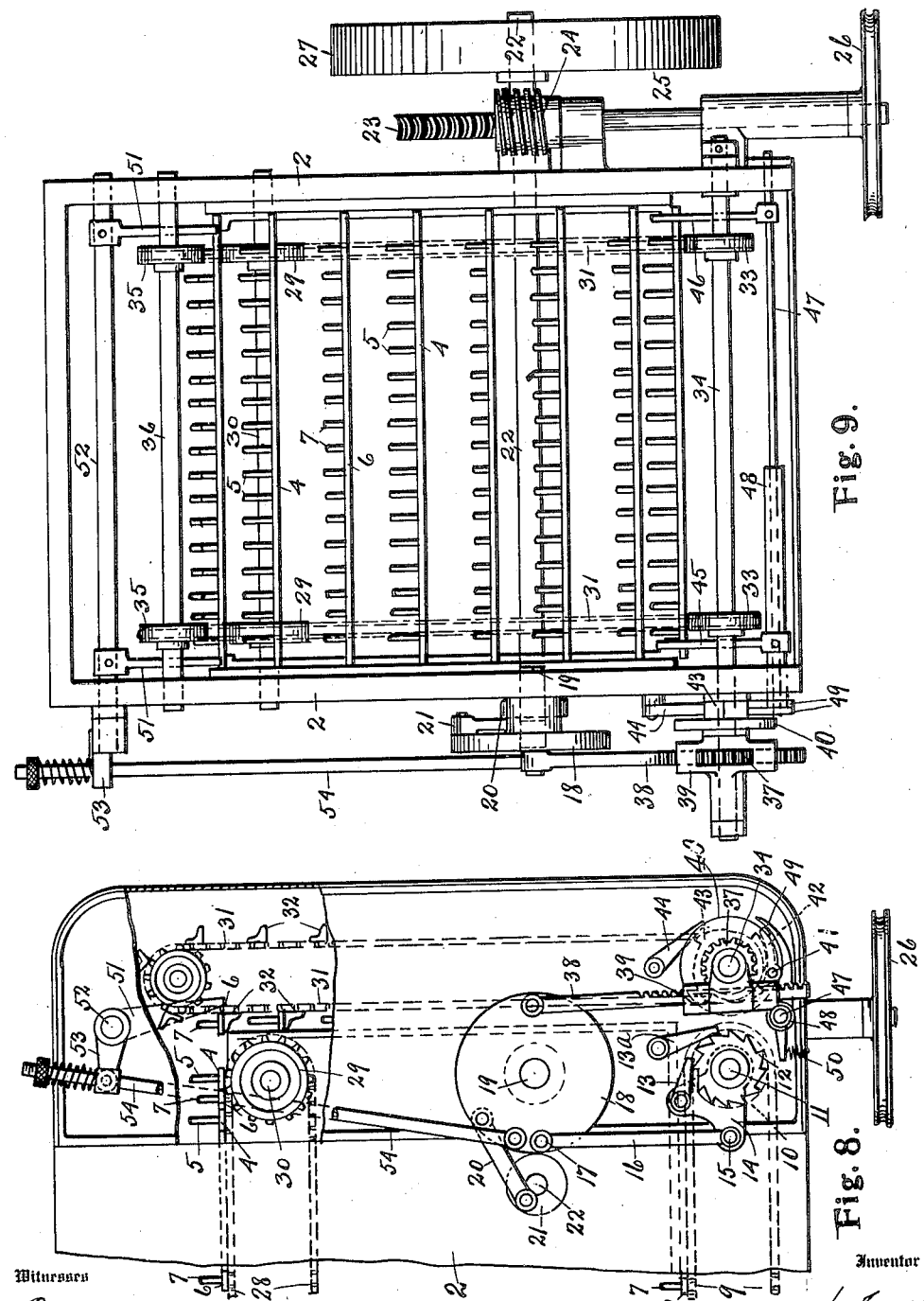

B. W. SCOTT.
APPARATUS FOR THE MANUFACTURE OF CAPSULES.
APPLICATION FILED AUG. 29, 1910.

1,076,459.

Patented Oct. 21, 1913.

10 SHEETS—SHEET 7.

B. W. SCOTT.
APPARATUS FOR THE MANUFACTURE OF CAPSULES.
APPLICATION FILED AUG. 29, 1910.

1,076,459.

Patented Oct. 21, 1913.
10 SHEETS—SHEET 8.

B. W. SCOTT.
APPARATUS FOR THE MANUFACTURE OF CAPSULES.
APPLICATION FILED AUG. 29, 1910.
1,076,459.
Patented Oct. 21, 1913.
10 SHEETS—SHEET 9.
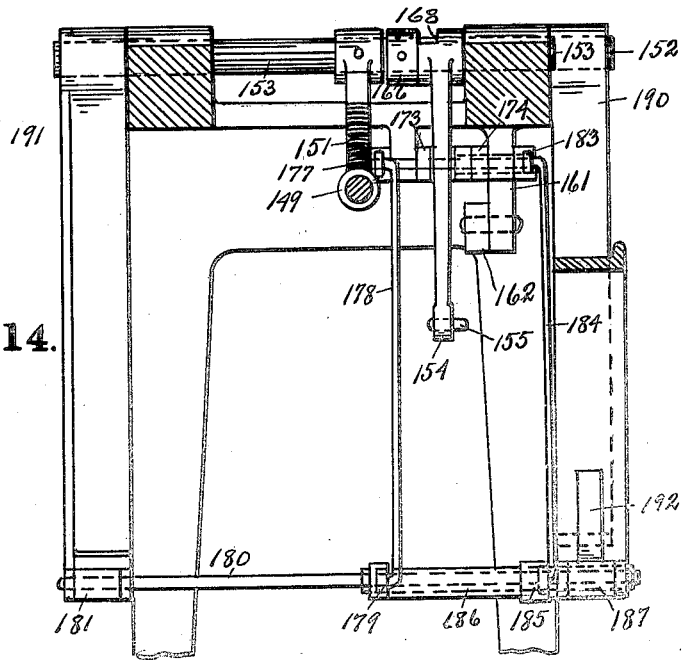
Fig. 14.
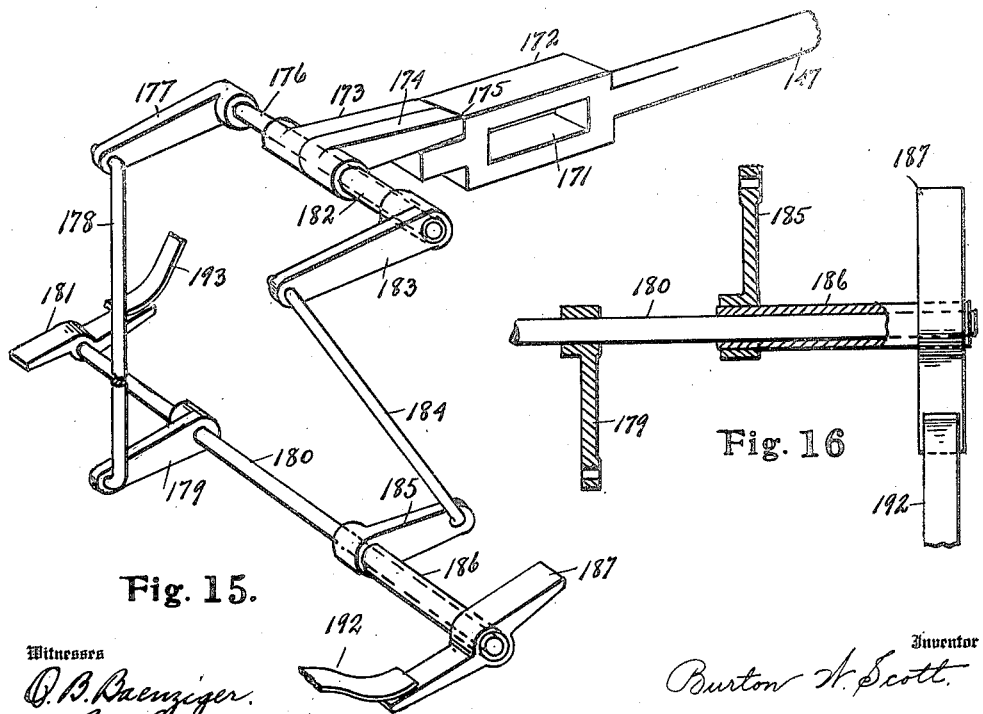
Fig. 15.
Fig. 16.
Witnesses
Q. B. Baenziger.
J. G. Howlett.
Inventor
Burton W. Scott.
By T. S. Wheeler, Attorney.

B. W. SCOTT.
APPARATUS FOR THE MANUFACTURE OF CAPSULES.
APPLICATION FILED AUG. 29, 1910.

1,076,459. Patented Oct. 21, 1913.
10 SHEETS—SHEET 10.

Witnesses
O. B. Baenziger.
J. L. Howlett.

Inventor
Burton W. Scott.
By T. A. Wheeler, Attorney.

UNITED STATES PATENT OFFICE.

BURTON W. SCOTT, OF DETROIT, MICHIGAN, ASSIGNOR, BY MESNE ASSIGNMENTS, TO ELI LILLY & COMPANY, OF INDIANAPOLIS, INDIANA, A CORPORATION OF INDIANA.

APPARATUS FOR THE MANUFACTURE OF CAPSULES.

1,076,459.   Specification of Letters Patent.   Patented Oct. 21, 1913.

Application filed August 29, 1910. Serial No. 579,513.

*To all whom it may concern:*

Be it known that I, BURTON W. SCOTT, a citizen of the United States, residing at Detroit, in the county of Wayne, State of Michigan, have invented certain new and useful Improvements in Apparatus for the Manufacture of Capsules; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to apparatus for manufacturing gelatin capsules, and consists in the construction, association, and cooperation of parts hereinafter more fully set forth and pointed out particularly in the claims.

The object of the invention is to provide simple and efficient means whereby the pins upon which the capsules are molded, may be dipped in a bath of gelatin and thereafter moved through a suitable drier, from which said pins are delivered to a stripping, trimming and joining machine and from said machine are conveyed to the dipping apparatus to again mold the capsule parts thereon, the operation being continuous and automatic.

The above object is attained by the mechanism illustrated in the accompanying drawings, in which:—

Figure 1:
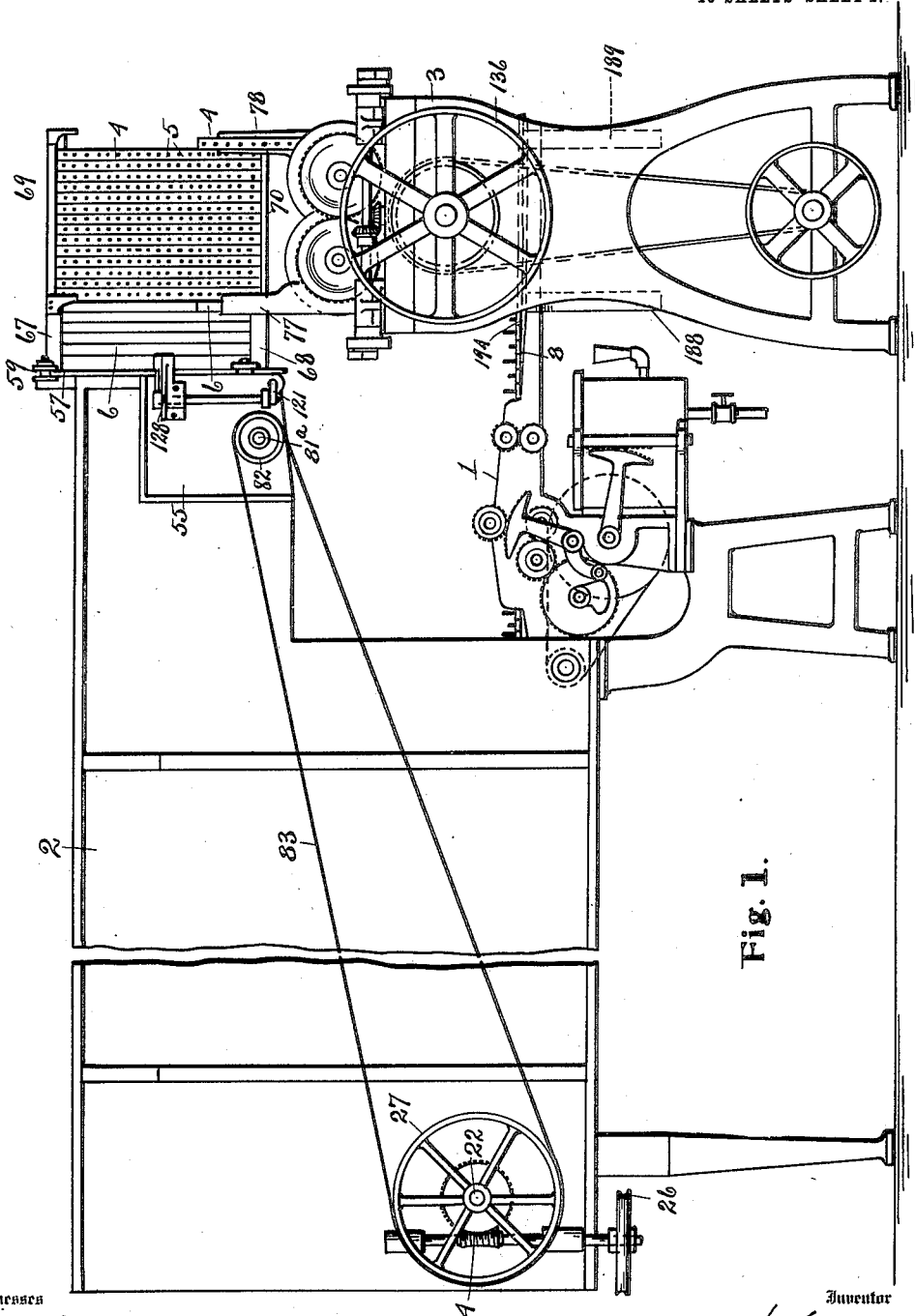
Figure 2:
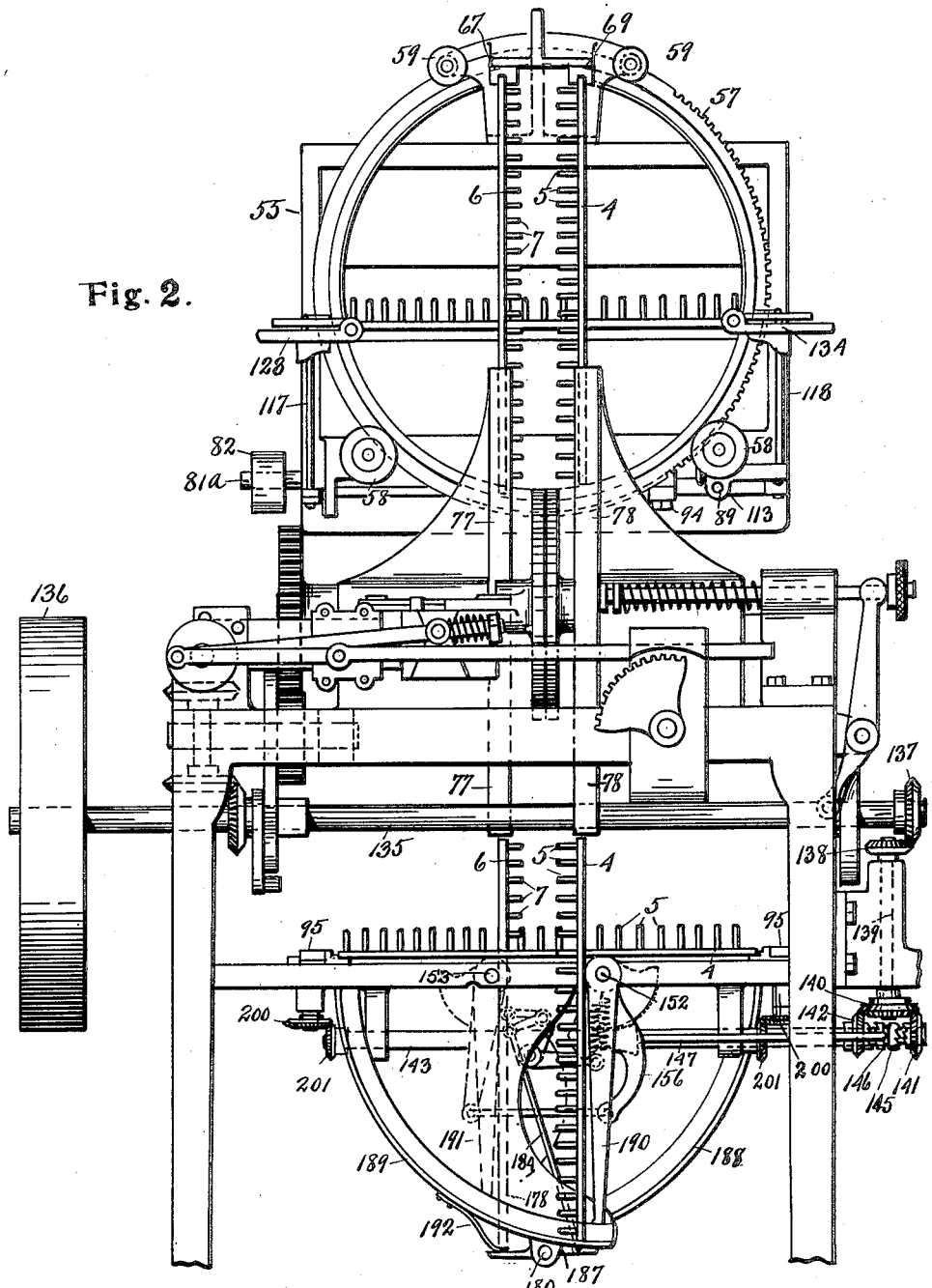
Figure 3:
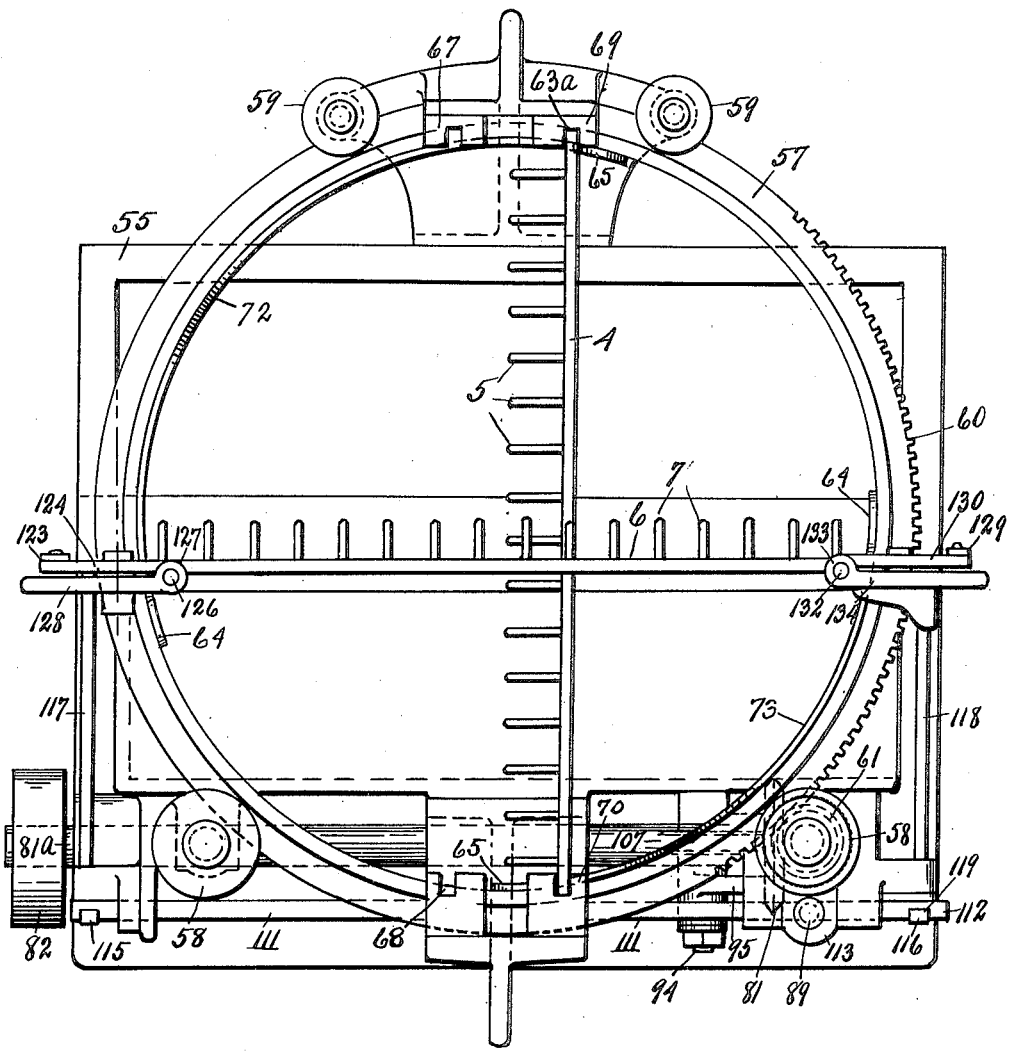
Figure 6:
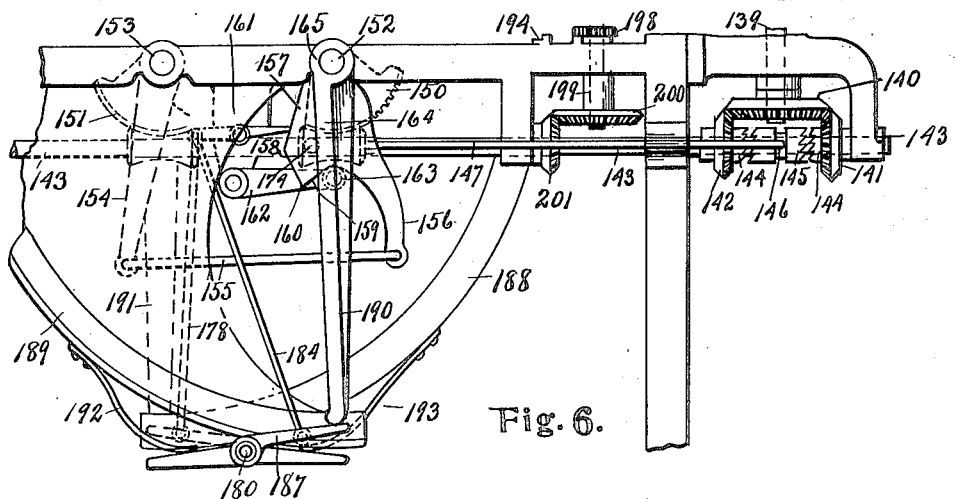
Figure 7:
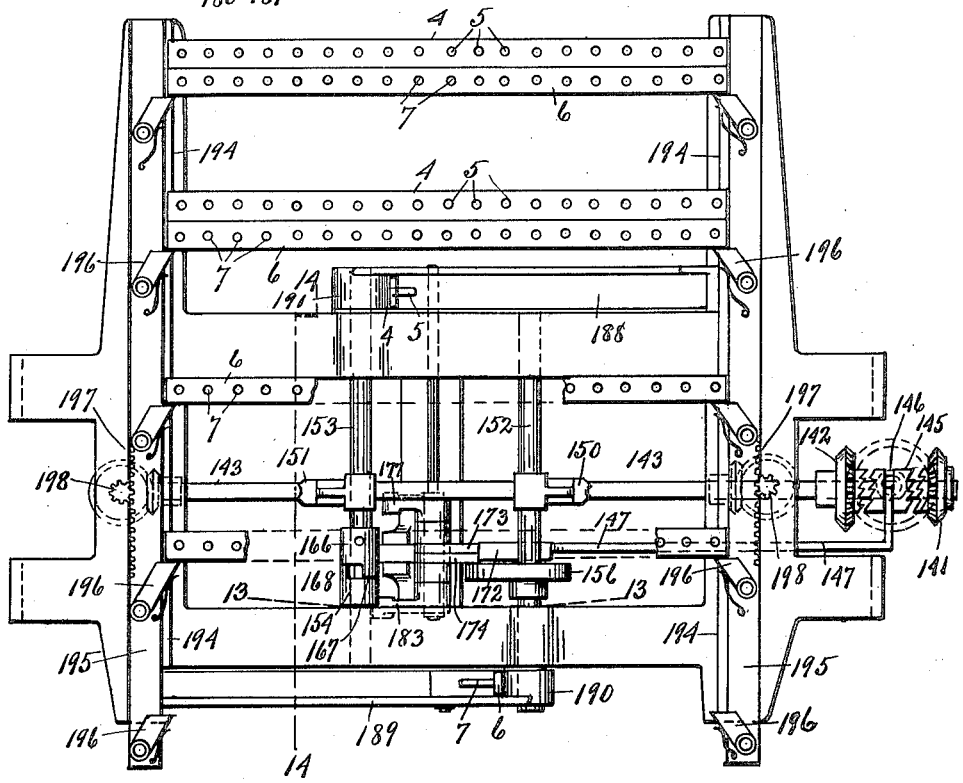
Figure 10:
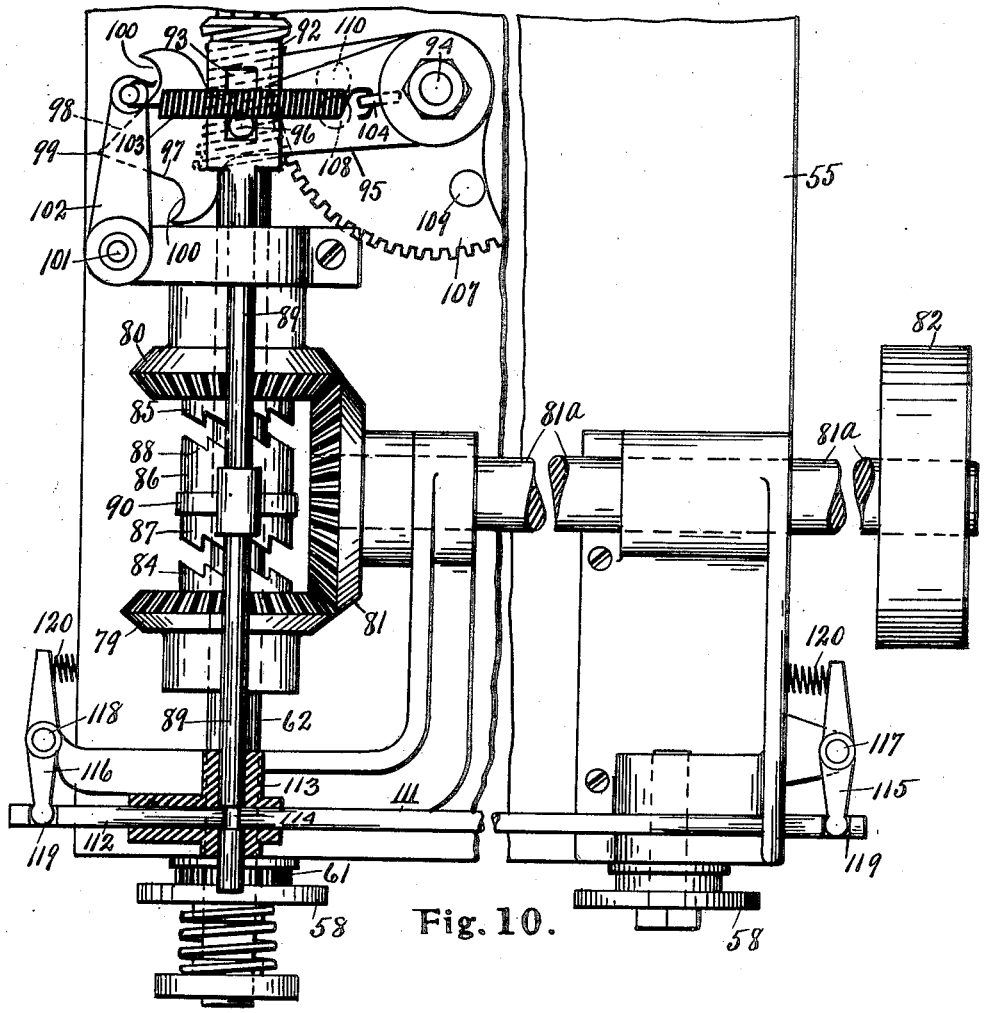
Figure 11:
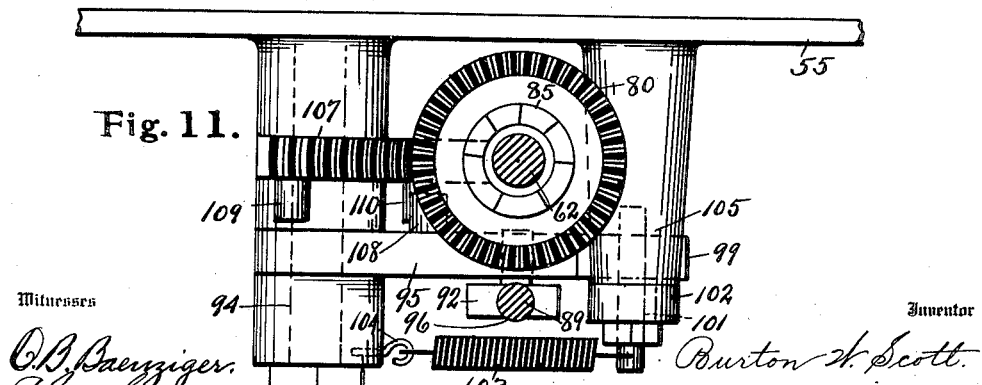
Figure 13:
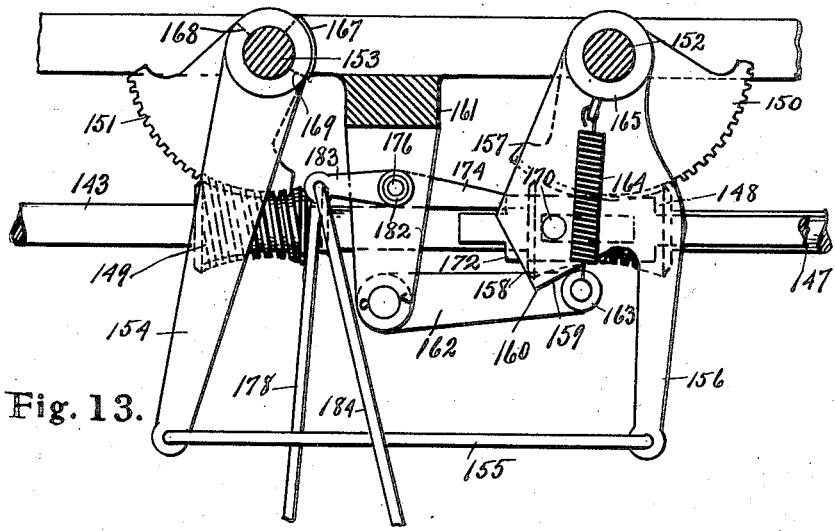
Figure 12:
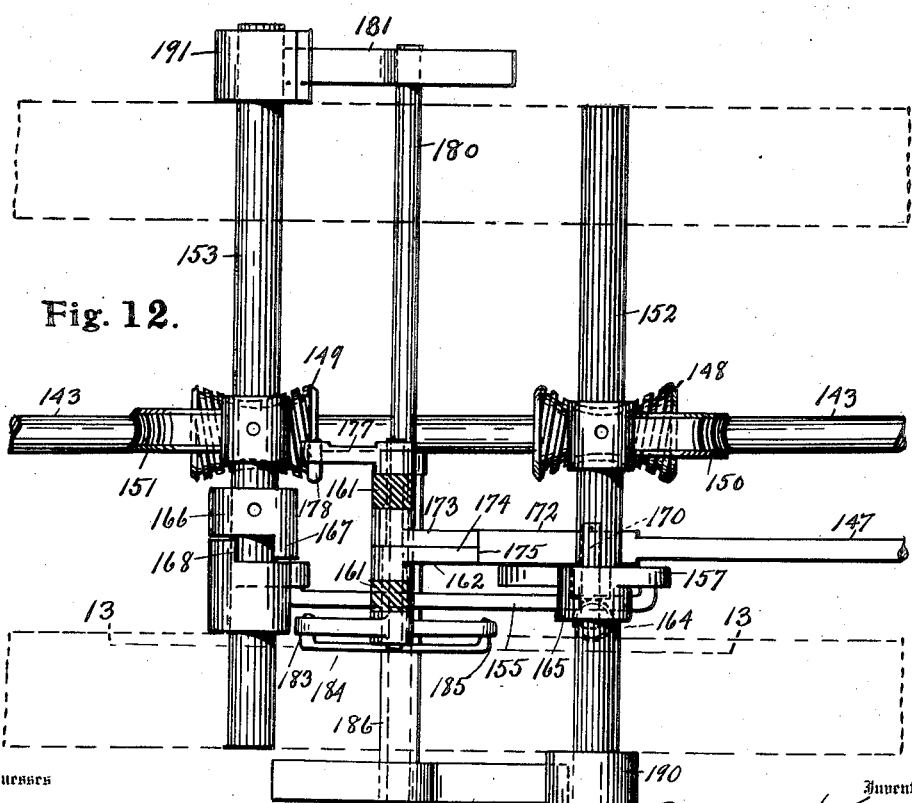
Figure 17:
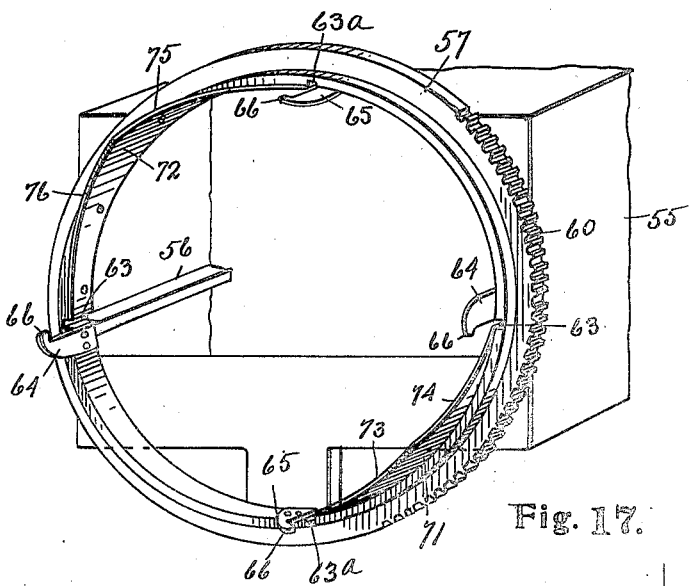
Figure 18:
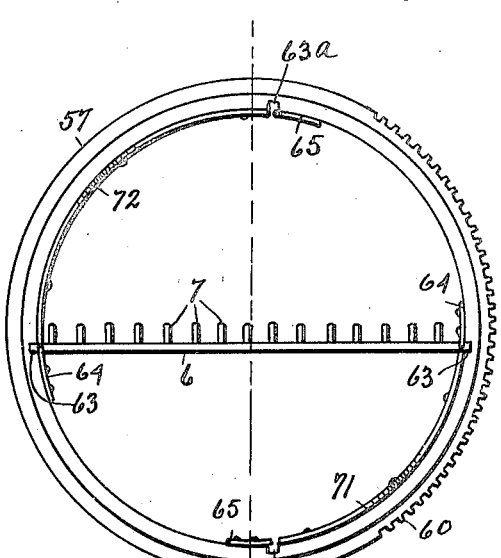
Figure 19:
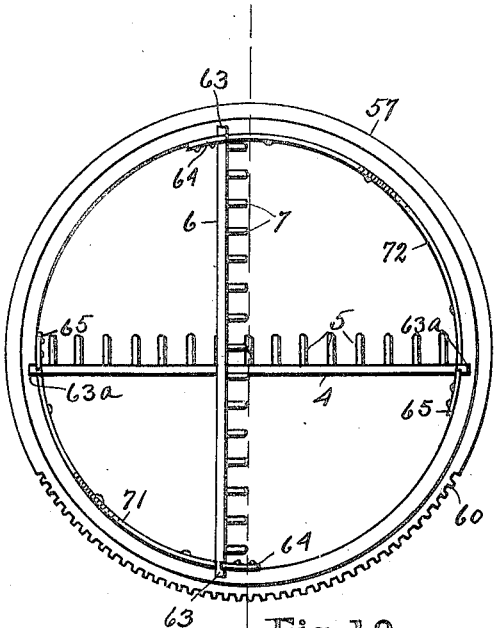

Figure 1 is a side elevation of an apparatus illustrating one embodiment of my invention. Fig. 2 is an end elevation thereof. Fig. 3 is an elevation of the mechanism at the delivery end of the drier, by means of which the pin bars carrying the pins which form the caps and bodies of the capsules, respectively, are successively presented in proper position to the stripping, trimming and joining machine. Fig. 4 is a top plan of the parts shown in Fig. 3. Fig. 5 is a fragmentary view, partly in section, of the reversing clutch mechanism, by means of which the pin-bar carriers are actuated. Fig. 6 is a fragmentary view in elevation of the mechanism which receives the pin bars after passing from the strippers and carries them to a horizontal position preparatory to being conveyed to the dipping device. Fig. 7 is a top plan view of Fig. 6. Fig. 8 is a side elevation of the rear end of the drier, showing the mechanism for elevating the pin bars to the horizontal conveyer in the upper portion thereof. Fig. 9 is a rear end elevation of Fig. 8. Fig. 10 is an inverted plan view, partly in section, of the reversing clutch mechanism, through the medium of which the pin bars are reversed. Fig. 11 is an enlarged sectional view on line 11—11 of Fig. 4. Fig. 12 is a fragmentary view in plan of the controlling mechanism of the reversing clutch and a portion of the mechanism for reversing the pin bars. Fig. 13 is a sectional view of the parts shown in Fig. 12, as on line 13—13 of Fig. 12. Fig. 14 is an enlarged sectional view, as on line 14—14 of Fig. 7. Fig. 15 is a fragmentary view in perspective of the mechanism for releasing the dogs which lock the actuating bar of the reversing clutch. Fig. 16 is a horizontal section through the lower shaft and sleeve shown in Fig. 15. Fig. 17 is an isometric view of the pin bar reversing ring. Fig. 18 is an elevation of said ring, showing a pin bar in position therein. Fig. 19 is a similar view, showing a pin bar reversed and a second bar in the ring in position for reversing.

Referring to the characters of reference, and especially to the construction shown in Fig. 1, 1 designates the dipping machine through which pass the bars carrying the capsule mold pins, and wherein said pins are dipped in a gelatin bath, a detailed description of which may be found in Letters Patent No. 943,608, dated December 14, 1909, and will not be entered into herein. From the dipping machine, the bars of mold pins with the gelatin capsules thereon are conveyed into a drying apparatus 2. At the discharge of the drying apparatus, the bars of mold pins are engaged by a reversing mechanism, by which said bars are reversed and fed in pairs into a capsule stripping, trimming and joining machine 3, wherein the caps and bodies of the capsules are slipped from the mold pins, trimmed to the required length and joined in the manner illustrated and described in Letters Patent No. 961,936 issued June 21, 1910; a detailed description therefore of such machine need not be repeated herein. After passing from the stripping, trimming and joining machine, the pin bars are reversed so as to cause the pins thereon to stand in the same direction and are conveyed in pairs to the dipping machine to complete a cycle of operation.

The mold pins which form the caps and bodies of the capsules are mounted to project laterally from suitable bars, and said bars are handled in pairs, each pair comprising a bar 4 carrying the relatively long pins 5 for forming the bodies of the capsules, and a bar 6 of the same length carrying the relatively short pins 7 for forming the caps of the capsules. These bars are conveyed in pairs from the stripping, trimming and joining machine upon a suitable track 8 (see Fig. 1), into the dipping machine where they are coated with gelatin and are passed from the dipping machine into the lower portion of the drying apparatus 2 onto an endless conveyer 9, more clearly shown in Fig. 8, said conveyer 9 being driven from suitable pulleys 10 on shaft 11 carrying at its outer end a ratchet wheel 12. Movement is imparted to said ratchet wheel and said shaft by means of a pawl 13, carried by a reciprocatory arm 14 journaled on the shaft 11 and having pivoted thereto at 15 the lower end of the connecting rod 16. The upper end of rod 16 is pivoted at 17 to an oscillatory disk 18 mounted on a stub shaft 19 journaled in the frame. Movement is imparted to the disk 18 through the medium of a pitman 20, one end of which is pivoted to said disk, and the other end to a relatively small disk 21 on the end of the drive shaft 22 which crosses the frame of the drying apparatus transversely and is properly journaled therein. It will be seen that a rotation of the shaft 22 will cause the disk 18 to oscillate and impart a similar motion to the arm 14 carrying the pawl 13, said movement of said arm causing the pawl to engage the ratchet 12 and impart an intermittent movement to the shaft 11. To prevent a backward movement of said shaft, there is employed a pivoted detent 13ª adapted to engage the teeth of said ratchet. On a projecting end of the shaft 22 is a worm wheel 23 engaged by a worm gear 24 on a vertical shaft 25 carrying a drive pulley 26 adapted to receive a belt from a motor, not shown. The shaft 22 also carries upon its projecting end a belt pulley 27.

Besides the lower conveyer 9 upon which the pin bars are carried, the drying apparatus contains an upper conveyer 28 passing around suitable pulleys 29 on a transverse shaft 30. It will be understood that the speed of the conveyers 9 and 28 is regulated so that the mold pins with their gelatin molds thereon shall remain in the drying apparatus a sufficient length of time to allow the gelatin to properly dry, and it will further be understood that the lower conveyer carries the pin bars rearwardly through the drier and the upper conveyer carries said bars forwardly to the discharge opening at the front end. To elevate the pin bars from the lower conveyer to the upper conveyer there are employed endless chains 31 carrying the laterally projecting brackets 32 on which said pin bars are adapted to rest on the elevating sides of said chains, as shown in Figs. 8 and 9. The elevating chains pass around and are driven by the rotation of suitable wheels 33 located on a horizontal shaft 34 journaled in the lower part of the drying machine frame, and driven in a manner hereinafter explained, said chains at their upper ends passing around similar wheels 35 on an upper horizontal shaft 36. Movement is imparted to the lower driving shaft 34 through the medium of a pinion 37 thereon engaged by the teeth of a reciprocatory rack bar 38 mounted to slide in a guide 39, and pivoted at its upper end to the oscillatory disk 18. Formed integral with the pinion 37 and mounted to rotate loosely therewith upon the shaft 34 is a disk 40. Pivoted at 41 to the inner face of said disk is a gravity pawl 42 adapted to engage the teeth of a ratchet wheel 43 fast to the shaft 34. While the gravity pawl 42 remains in engagement with the ratchet 43, the shaft 34 will be turned by each upward stroke of the rack bar 38, the return or downward stroke of said rack bar causing the pawl 42 to slip over the teeth of the ratchet 43 without imparting movement to the shaft 34. To prevent a backward movement of the elevating chains, there is employed a pivoted detent 44 adapted to engage the teeth of the ratchet 43 and hold the shaft 34 against backward turning.

The pin bars are fed to the elevating chains in a horizontal position, and said bars must lie straight transversely when presented to the elevating chains in order to insure a proper engagement therewith of the brackets 32 carried by said chains, and avoid the possibility of one end of the bar being lifted while the other still remained upon the lower conveyer 6. To obviate this difficulty I have arranged to prevent the operation of the elevating chains until the pin bars are presented in a straight transverse position with respect thereto, by the following prescribed mechanism:—Standing vertically in the path of travel of the pin bars are the trip arms 45 and 46, respectively, the arm 46 being mounted on a rock shaft 47, and the arm 45 being mounted upon a sleeve 48 rotatable on shaft 47. Said shaft and sleeve each carry at the outer end thereof a curved finger 49 which embraces and normally bears against the free end of the gravity pawl 42 to hold said pawl disengaged from the ratchet 43, each of said fingers being normally held in said position by means of a light tension spring 50 engaging an extension thereof, as shown in Fig. 8. Under normal conditions, the fingers 49 hold the pawl 42 from engagement with the ratchet 43, so that a movement of the rack bar 38 will impart no motion to the shaft 34. As the pin bars are carried along, however, by the lower conveyer 9, they will be caused to engage the trip arms 45 and 46 and will turn the shaft 47 and sleeve 38 sufficiently to carry the fingers 49 thereon away from the pawl 42, allowing said pawl to engage the ratchet 43 and impart movement to the shaft 34 through the medium of the rack bar 38. It will be understood that both of the fingers 39 engage the pawl 42 so as to hold it from engagement with the ratchet wheel 43, making it necessary that both fingers be actuated to carry them from contact with the pawl in order to permit said pawl 42 to become operatively associated with the ratchet. For that reason, should a pin bar be conveyed, to the elevating chains with one end in advance of the other, the elevating mechanism cannot be set in operation until said bar is transversely alined with respect to said chains, as contact of both ends of said bar with the trip arms 45 is necessary to set in motion the elevating mechanism. As the pin bars are elevated by the intermittent movement of the chains 31 to the level of the upper conveyer 28, they are successively removed from the carrying brackets 32 of said chains by the reciprocatory arms 51 which are hung from a rock shaft 52. Upon a projecting end of said shaft is a crank arm 53 with which is flexibly connected the upper end of a connecting rod 54, the lower end of said rod being pivoted to the oscillatory disk 18, so that as the disk oscillates, the shaft 52 is rocked and the arms 51 are swung to slide the pin bars successively from the brackets of the elevating chains onto the upper conveyer 28, as clearly shown in Figs. 8 and 9. As the elevating mechanism handles the pin bars sequentially their paired relation is maintained and they are presented to the upper conveyer in the drying apparatus in the same relative position that they enter the drying apparatus from the dipping machine. The upper conveyer delivers the pin bars to the discharge end of the drying machine where they encounter a reversing mechanism which receives said bars and successively swings them in opposite directions to a vertical position, in which position they are moved along horizontal tracks to the vertical guides through which they are fed into the stripping, trimming and joining machine, which, for convenience, will be hereinafter referred to as the "capsule or joining machine".

In describing the mechanism for delivering the pin bars from the drier to the capsule machine, reference will be made more particularly to Figs. 2, 3, 4, 5, 10 and 11. At the discharge end of the drying apparatus is located a box or case 55 which is preferably quadrangular in form and within which and upon which is mounted the pin bar reversing mechanism. Within the case 55 is a track 56 extending along each side thereof which is made to register with the discharge end of the upper conveyer of the drying apparatus, so that by the movement of said conveyer, the pin bars are delivered onto said track and are caused to slide thereon toward the outer end of the case, said bars being disposed in pairs and arranged so that the bars carrying the body pins and the bars carrying the cap pins, shall alternate. Disposed at the outer or discharge end of the case 55 is an oscillatory ring 57 mounted to oscillate in the arc of a vertical circle about a horizontal axis, the distance of travel of said ring being approximately equal to about one-quarter of a complete circle. Said ring is supported on its lower side by the flanged travelers 58, and at its upper side by the flanged travelers 59. Said travelers allow freedom of movement of said ring in the arc of a circle and support it in a vertical position. One portion of the arc of the ring is provided with gear teeth 60 which mesh with the pinion 61 on the outer end of the shaft 62 journaled below the bottom of the case 55 and driven to revolve in opposite directions in reciprocal succession, as hereinafter explained. In the inner arc of the ring 57 is a pair of diametrically opposed channels 63 adapted to receive the opposite ends of a pin bar to cause said bar to lie diametrically of the ring within the plane thereof. Also formed in the inner arc of the ring 57 is a pair of channels 63$^a$ disposed at right angles to the channels 63 and also adapted to receive the ends of a pin bar. As before stated, the movement of the upper conveyer of the drying apparatus carries the pin bars onto the track 56 in the case 55, the ends of said bars resting on said track and the pins thereof projecting upwardly, said bars being arranged in pairs, wherein the bars carrying the body pins and the bars carrying the cap pins alternate. When the ring 57 is at rest, it is always in a position to cause one pair of the channels 63 or 63$^a$ therein to register with the track 56, as shown in Fig. 17, so that by the movement of the upper conveyer of the drying apparatus, the outermost pin bar on the track 56 will be caused to slide from said track and into said registering channels in said ring, at which time movement is imparted to said ring to rotate it in the arc of a circle about a horizontal axis and swing the bar carried therein to a vertical position. Mounted on the inner face of said ring and registering with the pairs of channels therein are the supporting brackets 64 and 65, respectively, each of which is provided at its outer end with an arresting shoulder 66. As the pin bars are urged along the track 56, one of said bars during each period of repose of the ring 57 is caused to enter the pair of channels 63 or 63$^a$ which may at that time register with said track, so that a pin bar when lying in either of the pair of channels in the ring will extend diametrically thereof free from the track 56. Assuming that the ring is in the position shown in Fig. 17, a pin bar will be moved from the track 56 into the pair of channels 63, a position of parts illustrated in Fig. 18, and said ring will be rotated approximately one quarter of a turn to the right, a movement which will carry the bar 6 to the position shown in Fig. 19, in which position the ends of said bar register with a pair of channeled track members, comprising an upper track member 67 and a lower track member 68. This position of the ring will cause the channels 63$^a$ therein to register with the track 56 in position to receive the ends of a succeeding bar which will be carried thereinto by the operation of the upper conveyer, as before described. As a succeeding bar moves into the channels 63$^a$ said entering bar, which will be one of the bars 4, will engage the vertical bar 6 and force it out of the channel 63 so that its ends will enter the channels in the tracks 67 and 68; the arresting shoulders 66 on the brackets 64 preventing the vertical bar 6 being forced so far into the channeled track members 67 and 68 as to allow the entering bar 4 to pass too far through the ring 57 so as to assume an incorrect position therein. The ring 57 will then revolve to the left approximately one quarter of a turn so as to carry the pin bar 4 to a vertical position with the ends thereof in registering alinement with a pair of channeled tracks, comprising an upper track 69 and a lower track 70. It will be noted on referring to the drawings of the ring 57 that said ring carries opposed lateral flanges 71 and 72, the flange 71 having the cam faces 73 and 74, and the flange 72 having the cam faces 75 and 76. It will also be noted that these cam faces on the flanges 71 and 72 lead respectively from the margins of the channels 63 and 63$^a$ in the inner face of the ring; therefore, after a pin bar, as bar 6 in Fig. 19, shall have been caused to enter the horizontally extending track members 67 and 68, and the ring 57 shall have begun its rotation to the left, the cam faces 74 and 76 will engage the opposite ends of the pin bar and urge it horizontally along the horizontal track members 67 and 68 in the channels of which the ends of said bar lie. It will also be noted that this return movement of the ring carries the arresting shoulders 66 away from the pin bar so as to leave it free to move horizontally in said track members. The same operation is repeated with respect to the succeeding bar 4, which by the rotation of the ring to the left, is carried into registering alinement with the channels in the track members 69 and 70 so that the succeeding bar which enters the channels 63 of the ring will slide the bar 4 outwardly into the channeled track members 69 and 70 until arrested by the abutment shoulders 66 of the brackets 65, leaving said bar in such position that a succeeding rotary movement to the right will cause the cam faces 73 and 75 of the flanges 71 and 72 to engage said bar and move it horizontally along the channeled track members 69 and 70; this operation being repeated as often as the ring 57 oscillates, causing the bars 4 and 6 with their cap and body pins 5 and 7, respectively, to be fed along their respective horizontal track members and to the vertical guides 77 and 78, down which they are directed to the capsule machine. As the bars having the body pins and the bars having the cap pins must be fed into the capsule machine at different points and with their pins projecting inwardly, the necessity of reversing said bars in reciprocal succession and feeding them to the capsule machine from the drying apparatus by means of the oscillatory ring, will be understood, the bars being handled in pairs so that the bars carrying the cap and body pins, respectively, shall be fed to the machine in equal numbers.

The mechanism for imparting the necessary reciprocation or oscillation to the ring 56 and the means for controlling the operation of said mechanism so as to prevent the operation thereof except when a pin bar is in proper position within said ring, will now be described with reference more particularly to Figs. 4, 5, 10 and 11. As before stated, the ring 57 is driven through the rotation of the shaft 62 carrying the pinion 61 which meshes with the teeth 60 of said ring. Mounted upon the shaft 62 are the loose beveled gears 79 and 80 which are in constant mesh with the beveled gear 81 on a shaft 81$^a$ journaled to the lower side of the case 55 and driven by means of a pulley 82 thereon by a belt 83 (see Fig. 1) from the pulley 27. On the hub of gear wheel 79 are the jaw members 84, and on the hub of gear wheel 80 are similar jaw members 85. Splined to shaft 62 is a slidable clutch collar 86 having at its ends jaw members 87 and 88, respectively, adapted as said collar is shifted longitudinally on said shaft to engage the jaws of the gears 79 and 80, causing the shaft 62 to turn in opposite directions in reciprocal succession, accordingly as said clutch collar is caused to engage one or the other of the jaws of said gears, forming in effect a reversing clutch through the medium of which the direction of rotation of the shaft 62 is successively changed. The clutch collar 86 is actuated through the medium of a sliding bar 89 carrying a yoke 90 which engages in a channel 91 therein, whereby said clutch collar may be shifted on the shaft 62 as the bar 89 is reciprocated. The bar 89 at one end is provided with a rectangular head 92 in which is formed a longitudinal slot 93. Loosely mounted on a stub shaft 94 is a swinging arm 95 in which is set a pin 96 which lies freely within the slotted opening 93 of the bar 89. The outer end of the arm 95 is provided with the inclined cam faces 97 and 98 which converge to a point 99, the diverging terminals of said cam faces each terminating in a curved recess 100. Pivotally mounted at 101 is a swinging arm 102, the free end of which is connected by a strong coiled spring 103 to a fixed part, as at 104. Carried at the free end of the arm 102 is an antifriction roller 105 adapted to roll in contact with the cam faces 97 and 98 of the arm 95 as said arm swings on its pivot or fulcrum, said roller being at all times held forcibly in engagement with one or the other of said cam faces by the tension of the spring 103. On the end of shaft 62 is a worm gear 106 which meshes with and is adapted to turn a sector gear 107 loosely carried on the stub shaft 94 and adapted to be oscillated in the arc of a circle by the rotation of the worm 106. Projecting from a face of the cam 95 is a pin 108 which stands in the path of the pins 109 and 110, respectively, projecting from a face of the sector 107 to successively engage the pin on the arm 95, and swing said arm from side to side, at the limit of movement of said sector in opposite directions. The sliding bar 89 through the medium of which the clutch collar 86 is actuated, is normally locked against longitudinal movement by the locking bolts 111 and 112 whose inner ends are supported in the bearing 113 through which the sliding bar 89 is adapted to slide, the inner ends of said locking bolts normally engaging in a circumferential channel 114 in said bar. When the locking bolts are engaged in the channel of the bar 89, it is held against longitudinal movement in either direction and the parts have such relation that when said bar is so locked, the clutch collar 86 will be in a neutral position free from engagement with the clutch jaws 84 and 85 of the gears 79 and 80, leaving said gears free to revolve upon the shaft 62 without imparting a rotary movement thereto.

The locking bolts 111 and 112 are actuated by the crank arms 115 and 116, respectively, mounted upon vertically disposed rock shafts 117 and 118 suitably journaled at the side of the case, said crank arms having a jointed connection with their respective locking bolts, as shown at 119, whereby said bolts are moved longitudinally as the rock shafts of said crank arms are turned. To normally hold the inner ends of said locking bolts in the channel 114 of the bar 89, the ends of said arms engaging said bolts are constantly urged inwardly by means of the coiled springs 120 which are confined between the sides of the case and an extension of said arms, as clearly shown in Fig. 10. Movement is imparted to the rock shafts 117 and 118 to actuate the locking bolts, through the medium of the crank arms carried by said shafts and engaging said bolts, by means of the cranks 121 and 122 mounted thereon, respectively, and shown more clearly in Fig. 4. To the free end of crank 121 is pivoted a connecting rod 123, said rod being in turn pivoted to a lever 124 fulcrumed at its center and having a jointed engagement, as at 125, with a tripping plunger 126 mounted to slide horizontally in a suitable support 127 at the end of a bracket 128 which projects forwardly from the case and carries said parts. By an outward pressure against the tripping plunger 126, the lever 124 will be operated to turn the rock shaft 117 through the medium of the connecting rod 123 and crank 121, thereby swinging the crank arm 115 against the action of the spring 120 to withdraw the locking bolt 111 from the channel 114 in the bar 89. In like manner movement is imparted to the rock shaft 118 through the medium of a connecting rod 129 pivoted to the crank 122 and to a lever 130 fulcrumed at its center and having a jointed engagement at 131 with a tripping plunger 132 mounted to slide in a suitable support 133 at the outer end of a bracket 134 projecting from the frame or case and carrying said parts. An outward pressure against the end of the tripping plunger 132 will move the lever 130 and turn the rock shaft 118 through the medium of the connecting rod 129 and the crank 122, thereby swinging the crank 116 at the lower end of said shaft against the action of the spring 120 to withdraw the locking bolt 112 from the channel 114 in the bar 89. It will be noted that both of the bolts lock the bar 89 against longitudinal movement, and that it is necessary to retract both of said bolts to release said bar. It will further be noted that the inner ends of the tripping plungers 126 and 132 lie in the plane of the track 56 upon which the pin bars travel, and also in the plane of the pair of channels in the ring 57 which are horizontally disposed when said ring is at rest. The purpose of this arrangement is to control the rotary movement of said ring by the position of the pin bars therein to prevent the possibility of said ring being rotated until each succeeding bar shall have been properly entered and positioned therein. Should one of the pin bars enter the ring from the track 56 with one of its ends in advance of the other, the ring 57 will not turn until said bar lies in perfect transverse alinement in the ring at right angles to the axis thereof, for the following reason:—Should one end of a pin bar enter the ring in advance of the other, it will engage one or the other of the tripping plungers and actuate the mechanism to withdraw one or the other of the locking bolts from engagement with the bar 89. The other locking bolt will still remain in locking engagement with said bar, preventing any movement thereof until the other plunger is tripped which will not occur until the angularly positioned bar shall have been urged forward so as to cause its lagging end to actuate the other tripping plunger, at which time, because of the position of said plungers, the bar will lie in straight transverse position within the ring. Upon the release of the locking bolts 111 and 112 the sliding bar 89 will be free to move in either direction and will be moved in a direction in accordance with the position of the reversing mechanism which controls the momement of said bar at the time said bar is released. Should the locking bolts be actuated to release the sliding bar when the parts are in the position shown in Fig. 10, the tension stored in the spring 103 will cause the antifriction roller 105 carried at the free end of the arm 102 to bear with such force against the cam face 98 of the arm 95 as to swing said arm upon its fulcrum and cause the pin 96 carried thereby to engage one terminal of the slot 93 in the head of the bar 89 and shift said bar longitudinally such distance as to carry the clutch collar 86 into engagement with the jaws 84 of the gear wheel 79.

It will be understood that the gears 79 and 80 are revolved continuously by means of the engagement of the gear 81 therewith on the continuously rotating shaft 81ª so that upon the instant of the engagement between the clutch collar 86 and the clutch members of the gear 79, the shaft 62 will be turned through the medium of the gear 79 and clutch collar, thereby causing the pinion 61 thereon to revolve the ring 57 in a proper direction in accordance with the position of the parts at that time. As the shaft 62 is revolved, the worm 106 thereon engaging the sector gear 107, will swing said sector and cause the pin 109 projecting therefrom to engage the pin 108 on the arm 95, swinging said arm with the movement of said sector such distance as to cause the antifriction roller 105 on the arm 102 to ride over the point 99 against the action of the spring 103, when the tension of said spring drawing said roller against the cam face 97 of the arm, will throw it quickly over, causing the pin 96 therein working in the slot 93 of the bar 98 to engage the terminal of said slot and quickly shift said bar to withdraw the clutch collar 86 from engagement with the clutch jaws 84 of the gear wheel 79, thereby stopping the rotation of the shaft 62. As the bar 89 is shifted by the operation just described, the locking bolts 111 and 112, the inner ends of which normally lie against the periphery of said bar and are urged inwardly by the springs 120, will, as soon as the channel 114 in said bar is brought into alinement with the ends of said bolts, quickly enter said channel and lock said bar against further longitudinal movement, said bar being arrested at such a point as to leave the clutch collar 86 in the neutral position, as shown in Fig. 10. The shaft 62 will remain at rest until the tripping plungers 126 and 132 are again actuated to retract the locking bolts 111 and 112 when the tension of the spring 103 will crowd the antifriction roller 105 of the arm 102 against the cam face 97 of the arm 95 and move said arm such distance as to cause the pin 96 thereon to engage the outer terminal of the slot 93 and slide the bar 89 such distance as to carry the clutch collar 86 into engagement with the clutch jaws 85 of the gear 80, thereby locking said gear to the shaft through said clutch collar and reversing the direction of rotation of the shaft 62, which movement will cause the sector gear 107 to swing back in the opposite direction and will carry the pin 110 thereon into engagement with the pin 108 on the arm 95 and swing said arm so as to cause the antifriction roller on the arm 102 to ride over the point 99 and engage the opposite cam face 98 of said arm 95, the force of the spring 103 after said antifriction roller shall have passed the point 99, drawing said roller against said cam face 98, will urge the arm 95 quickly over and will slide the bar 89 through the engagement of the pin 96 on said arm with a terminal of the slot 93 in said bar and withdraw the clutch collar 86 from engagement with the clutch jaws or members 85 of the gear 80, thereby again stopping the rotation of the shaft 62, a position in which said parts remain until the tripping plungers 126 and 132 are again actuated to withdraw the locking bolts from the channel 114 in the bar 98, when said bar will again be shifted through the medium of the spring 103 to again carry the clutch collar 86 into engagement with the clutch jaws of the gear 79 when the shaft 62 will again be rotated. These operations are repeated in reciprocal succession and result in an intermittent rotation of the shaft 62 in opposite directions, which intermittent movement of said shaft imparts the necessary oscillatory movement to the ring 57 to successively reverse the pin bars as they are fed thereto in the manner before described.

The foregoing explanation completes the description of the feeding of the pin bars from the drying apparatus to the capsule machine and reversing them so that the pins on said bars shall project inwardly as they are fed through said machine in position to be properly acted upon by the stripping mechanism, through the medium of which the caps and bodies of the capsules are stripped from the mold pins of the pin bars, an operation fully set forth in the before mentioned Letters Patent No. 961,936.

From the capsule machine the pin bars, after the caps and bodies have been stripped therefrom, are restored to their original horizontal position in pairs with the pins projecting upwardly in the following manner, reference being had more particularly to Figs. 2, 6, 7, 12, 13, 14, 15 and 16:—The vertical guides 77 and 78 down which the pin bars are directed into the capsule machine extend vertically through said machine so as to direct said bars to the lower reversing mechanism, wherein they are returned to a horizontal position with their pins projecting upwardly and are arranged in pairs, comprising a bar of body pins and a bar of cap pins, a relation which is maintained while said bars pass through the dipping machine and through the drying apparatus. The lower pin bar reversing and pairing mechanism is driven from a shaft 135 of the capsule machine rotated through the medium of a belt pulley 136 and carrying at one end a beveled gear 137 which meshes with a pinion 138 on the upper end of a short vertical shaft 139. The lower end of shaft 139 carries a beveled gear 140 which meshes with like gears 141 and 142 loosely mounted on the transverse shaft 143. The hub of each of the gears 141 and 142 is provided with clutch members 144. Mounted upon the shaft 143 between the hubs of said gears and splined thereto is a slidable clutch collar 145 having at its ends jaw members adapted to engage the jaw members, respectively, of said gears. Clutch collar 145 is provided with a peripheral channel 146 in which engages the end of a reciprocatory shifting rod 147 adapted by a longitudinal movement thereof to shift the clutch collar 145 successively into engagement with the clutch members of the gears 141 and 142 to effect a reverse rotation of the shaft 143 in reciprocal succession. The shaft 143 has mounted thereon the worms 148 and 149 provided with right and left threads, respectively. Meshing with said worms are the sector gears 150 and 151 mounted respectively upon rock shafts 152 and 153, whereby as the shaft 143 is rotated, said sectors are swung in opposite directions in the arc of a circle, thereby rocking their respective shafts. Mounted on the rock shaft 153 to swing therewith is a crank arm 154, to the lower end of which is pivotally attached one end of a connecting rod 155, the opposite end of said rod being pivotally attached to the depending end of an arm 156 formed integral with a cam plate 157 which hangs loosely from the rock shaft 152. On the lower side of the plate 157 are the inclined cam faces 158 and 159; said faces converge to a point 160 (see Fig. 13). Pivoted to the lower end of a depending post 161 is an arm 162 which lies in a substantially horizontal plane and carries at its free end an antifriction roller 163 which is adapted to engage the cam faces 158 and 159 of the plate 157, and is at all times held forcibly against one or the other of said faces by means of the coiled spring 164 attached at one end to the terminal of said antifriction roller, and at the other end to the hub 165 of the plate 157. The crank arm 154 is loose upon the shaft 153 and is given a limited movement in opposite directions by the rocking of said shaft through the medium of a collar 166 which is fixed to the shaft 153 and is provided with a lateral extension 167 which lies between and is adapted to successively engage the lateral shoulders 168 and 169 on the hub of said crank arm, whereby said arm is swung a short distance at the limit of movement of the shaft 153 in each direction. Projecting from the side of the cam plate 157 is a pin 170 which lies in the horizontal slot 171 formed in the head 172 of the shifting rod 147 whereby the reciprocatory movement of the cam plate will cause said pin to successively engage the terminals of the slot 171 and shift the rod 147 in a manner to cause the clutch collar 145 to successively engage the clutch members on the hubs of the gears 141 and 142, thereby imparting to the shaft 143 an intermittent rotation in opposite directions. The normal position of the reversing mechanism with the shifting rod 147 in repose is illustrated in Fig. 13, in which position the shifting rod is locked by engagement of the detents 173 and 174, shown more clearly in Fig. 15, with the shoulder 175 on the head of the shifting rod 147 and the clutch collar is held in a neutral position upon the shaft 143 free from engagement with the clutch members on the hubs of the gear wheels 141 and 142. It will be noted on referring to Fig. 13 that in the position of parts just described, the antifriction roller 163 is urged against the cam face 159 of the plate 157 by the tension of the spring 164, thereby crowding said plate toward the left and causing the pin 170 therein to engage the terminal of the slot 171 at the end of the rod 147, whereby the shoulder 175 on the head of said rod is held with force against the ends of the detents 173 and 174. In this position, the mechanism is locked and cannot be started until said detents are tripped to raise them from engagement with the shoulder 175 of the shifting rod.

Provision is made for tripping the detents to release the shifting rod in the following manner:—Detent 173 is mounted on a rock shaft 176 suitably journaled and carrying a crank arm 177 fast thereto. Attached to the outer end of said crank arm is a connecting rod 178 which is also attached to a crank arm 179 on the lower shaft 180 carrying at its end a tripping finger 181. Detent 174 is mounted upon a sleeve 182 which is journaled upon the shaft 176, whereby said detents are permitted to move independently. On the sleeve 182 is a crank arm 183 attached to a connecting rod 184 which is in turn attached to a crank arm 185 on a lower sleeve 186 journaled on the shaft 180. Fast to the end of the sleeve 186 is a tripping finger 187. Depending from the frame of the capsule machine are two curved tracks 188 and 189 which describe a quadrant and stand in opposite directions. The tripping finger 187 extends through an opening at the lower end of track 189 just below the depending end of the swinging arm 190 carried on and movable with the rock shaft 152, while the tripping finger 181 extends through an opening in the lower end of the track 188 just below the depending end of the swinging arm 191 mounted on and movable with the rock shaft 153. The pin bars 4 and 6 when they fall from their guides 77 and 78, respectively, after passing through the capsule machine, drop in a vertical position onto their respective tracks 188 and 189, as clearly shown in Fig. 2, in which position said bars lie in front of the swinging arms 190 and 191. The pin bar 4 in its fall strikes with its lower end the tripping finger 187, thereby depressing the raised end of said finger and turning the sleeve 186. This movement swings the crank 185 and the crank 183 through the medium of the connecting rod 184, whereby the upper sleeve 182 is turned and the detent 174 left free from engagement with the shoulder 175 of the shifting rod 47. In like manner the fall of the bar 6 will cause the lower end thereof to strike and depress the finger 181, thereby turning rock shaft 180 and swinging the crank arm 179 which imparts a similar movement to the crank arm 177 through the connecting rod 178, whereby the shaft 176 is turned to lift the detent 173 from the shoulder 175 of the shifting rod 147. When both of said detents are thus raised from engagement with said shoulder, the tension of the spring 164 which holds the antifriction roller 163 forcibly against the cam face 159 of the plate 157, will swing said plate to the left (see Fig. 13) and cause the pin 170 thereon lying in the slot 171 of the bar 147 to shift said bar longitudinally and carry the clutch collar 145 into engagement with the clutch members on the hub of the gear 142, when said gear will impart to the shaft 143 a rotary movement. As said shaft 143 turns, the worms 148 and 149 thereon engaging the sector gears 150 and 151, respectively, will actuate said gears to rock the shafts 152 and 153 in opposite directions, whereby the arms 190 and 191, respectively, carried by said shafts, will be swung in the arc of a circle in opposite directions to carry the pin bars 4 and 6 to a horizontal position with their pins projecting upwardly, from which position the pin bars are carried onto a horizontal track on which they are conveyed to the dipping machine by a feeding mechanism hereinafter explained. When the arms or sweeps 190 and 191 shall have reached the limit of their upward travel to carry the pin bars into a horizontal position, the shaft 153 by the rotation thereof will have caused the extension 167 on the collar 166 to have engaged the shoulder 168 on the hub of the arm 154 and will have swung said arm and actuated the cam plate 157 to carry the point 160 thereon past the antifriction roller 163, when the tension stored in the spring 164 drawing said roller forcibly against the cam face 158 of said plate, will shift said plate suddenly to the right from the position shown in Fig. 13, causing the pin 170 carried thereby to engage the terminal of the slot in the bar 147 and shift said bar to the right such distance as to carry the clutch collar 145 from engagement with the clutch members on the hub of the gear 142 into engagement with the clutch members on the hub of the gear 141, thereby disengaging the gear 142 from the shaft 143 and connecting gear 141 with said shaft. This change of position of the clutch 145 causes the shaft 143 to at once revolve in the opposite direction, whereby the sectors 150 and 151 are returned to their first position, rocking the shafts 152 and 153 and returning the arms 190 and 191 on said shafts, respectively, back to a vertical position, as shown in Fig. 6. The return movement of the shaft 153 will cause the lateral projections 167 on the collar 166 on said shaft to engage the shoulder 169 (see Fig. 13) on the hub of the arm 154 and swing said arm to the right, said arm carrying with it the arm 156 through the medium of the connecting rod 155 and actuating the cam plate 157 to cause the antifriction roller 163 to ride from the cam face 158 thereof past the point 160 into engagement with the cam face 159, when the force exerted by the spring 164 will shift the plate 157 quickly to the left, causing the pin 170 carried thereby to shift the rod 147 and withdraw the clutch collar 147 from engagement with the clutch members on the gear wheel 141. As the rod 147 is drawn to the left, it is arrested by the engagement of the shoulder 175 thereon with the ends of the detents 173 and 174 at a point in its longitudinal travel when the clutch collar 145 shall have been moved thereby to the neutral position upon the shaft 143 midway between the clutch members on the gear wheels 141 and 142, a position in which both gear wheels are disconnected from the shaft 143, thereby stopping the rotation thereof. The detents 173 and 174 after being tripped by the pin bars striking the tripping fingers 181 and 187 to release the shifting rod 147, are returned to their normal position after the pin bars shall have been moved from engagement with said finger by means of the flat springs 192 and 193, respectively, the tension of which is sufficient to actuate the connected parts and return the free ends of said detents into the path of the shoulder 175 of the shifting rod 147, so that upon the return of said rod to the left, it will be arrested by said detents to hold the clutch collar in the neutral position until said detents are again tripped. It will therefore be apparent that the movement of the sweeps or arms 190 and 191 which carry the pin bars upwardly on the curved tracks 188 and 189, is from a vertical to a horizontal and back to a vertical position, said bars being arrested each time they are returned to the vertical position shown in Figs. 2 and 6.

At the time the pin bars are discharged from the guides 77 and 78 of the capsule machine, one may be slightly in advance of the other and in falling will trip its detent actuating finger. Should the mechanism start to operate when tripped by the first bar discharged from the capsule machine guide before the other bar shall have been so discharged, serious damage to the machine would follow. By providing for locking the shifting rod 147 by means of two detents, both of which must be tripped to release said rod, the mechanism cannot begin operation until both pin bars shall have been discharged from the guides of the capsule machine and are free to be swung to a horizontal position by the arms 190 and 191. When the pin bars 4 and 6 shall have been swung to a horizontal position by the sweeps or arms 190 and 191, their ends are caused to lie upon a horizontal track 194 which communicates with the track 8 (see Fig. 1) leading to the dipping machine. To carry the pin bars from their position on the swinging arms 190 and 191 after they shall have attained a horizontal position, there are employed the feeding slides 195 which are located parallel with the track 194 and upon which are pivotally mounted the spring actuated dogs 196. Said slides are provided on one edge with rack teeth 197 which mesh respectively with the pinions 198 on the upper end of the vertical shafts 199, each of said shafts carrying at its lower end a beveled gear 200 which meshes with a beveled pinion 201 on the shaft 143. By reason of said pinions and gears the rack-engaging pinions are rotated to cause the slides 195 to travel forward and backward in suitable guides in the frame, whereby the dogs 196 thereon will be caused to successively engage the opposite ends of the pin bars and move them along the track 194, the arrangement and operation of parts being such as to present said pin bars in pairs to the dipping machine, each pair comprising a bar 4 carrying the body pins 5 and a bar 6 carrying the cap pins 7, as shown at the upper part of Fig. 7. The operation of the slides 195 through the medium of the spring actuated dogs carried thereby, feed the bars horizontally along the track 194 until they are received by the mechanism of the dipping machine, wherein the pins of said bars are dipped into the gelatin bath and from whence said pin bars are conveyed to the drying apparatus, as before described, thus completing the operation; said bars with their mold pins moving continuously through the drying apparatus, the capsule machine, the dipping machine, and back to the drier, during all of which travel said bars are handled automatically and their relative position so preserved as to maintain the paired relation between the bars having the cap pins and the bars having the body pins, so that each time the bars are returned to the capsule machine, they are properly directed to their respective guides and are caused to pass through said machine in their proper relative position.

Having thus fully set forth my invention, what I claim as new and desire to secure by Letters Patent, is:—

1. Mechanism for making capsules, comprising a dipping apparatus, a drier, a capsule assembling machine, movable mold pins arranged in pairs, each pair comprising body pins and cap pins, means for delivering said pins in pairs from the drying apparatus, means for separating the body pins from the cap pins and feeding said separated pins in independent courses through the capsule machine, and means for reassembling said pins in pairs and conveying them to the dipping apparatus.

2. Apparatus for making capsules comprising a drying machine, a capsule assembling machine, movable pin bars arranged in pairs, each pair comprising a bar having pins thereon for forming the bodies of the capsules, and a bar having pins thereon for forming the caps of the capsules, means for delivering said bars in pairs from the drying apparatus in a horizontal position, said bars being so disposed that the cap bars and the body bars shall alternate and that the pins of all of the bars shall project vertically, means for successively reversing said bars so as to cause them to occupy a vertical position with their pins projecting laterally, and means for feeding said bars so disposed to their respective guides in which they pass vertically through the capsule assembling machine.

3. An apparatus for making capsules, comprising a drier, a capsule assembling machine, movable pin bars arranged in pairs, each pair comprising a bar having body pins thereon and a bar having cap pins thereon, means for delivering said bars in pairs from the drier in a horizontal position with said bars so disposed that the cap bars and pin bars shall alternate, means for successively engaging said bars and conveying them to their respective guides on the capsule assembling machine in position to pass through said machine in the operation of making capsules.

4. Mechanism for the purpose set forth, comprising a drying apparatus, a capsule assembling machine, movable mold pins for molding the caps and bodies of the capsules, respectively, means for moving said pins through the drier collectively, and means for separating said pins at the capsule assembling machine and directing them through said machine in independent courses.

5. Mechanism for the purpose set forth, comprising a dipping apparatus, a drier, a capsule assembling machine, movable mold pins for forming the caps and bodies of the capsules, respectively, means for receiving said pins from the dipping apparatus and carrying them through the drier collectively, means for separating the cap and body pins at the capsule assembling machine and directing them through said machine in independent courses, and means at the discharge of the capsule assembling machine for reassembling the cap and body pins and feeding them to the dipping apparatus collectively.

6. Mechanism for the purpose set forth, comprising a dipping apparatus, a drier, a capsule assembling machine, movable pin bars each carrying a plurality of pins, a number of said bars having pins for molding the caps of the capsules, and a number of said bars having pins for molding the bodies of the capsules, means for feeding said bars from the dipping apparatus through the drier collectively, means for separating said pin bars at the capsule assembling machine and feeding the bars having the cap pins and the bars having the body pins through said machine in independent courses, and means at the discharge of the capsule assembling machine for reassembling said bars and feeding them collectively to the dipping apparatus.

7. An apparatus for making capsules, comprising a dipping apparatus, a drier, a capsule assembling machine, movable pin bars arranged in pairs, each pair comprising a bar having body pins and a bar having cap pins, means for delivering said bars in pairs from the drying apparatus, means for separating the bars having the body pins from the bars having the cap pins and feeding said separated bars in independent courses through the capsule assembling machine, and means for reassembling said bars in pairs and conveying them to the dipping apparatus.

8. An apparatus for making capsules, comprising a drier, a capsule assembling machine, movable pin bars arranged in pairs, each pair comprising a bar having cap pins and a bar having body pins, means for delivering said bars in pairs from the drying apparatus in a horizontal position with said bars so disposed that the cap bars and pin bars shall alternate and that the pins of all of the bars shall project vertically, means for separating the cap bars and body bars and for swinging them from a horizontal to a vertical position and reversing them so that their pins shall project laterally in opposite directions, and means for feeding said bars so disposed to their respective guides in which they pass vertically through the capsule machine.

9. Mechanism for the purpose described, comprising a capsule assembling machine, movable pin bars, a number of said bars carrying body pins and a number carrying cap pins, intermittently operatable pin bar reversing mechanism comprising means for alternately engaging said cap bars and said body bars and swinging them into a vertical position for feeding into the capsule assembling machine, and means for tripping said reversing mechanism actuatable only when a bar is in proper position to be acted upon thereby.

10. In apparatus for the purpose set forth, pin bar reversing mechanism comprising an oscillatory ring adapted to receive movable pin bars in a horizontal position and swing them to a vertical position by a movement of said ring in the arc of a circle in opposite directions in reciprocal succession, means for imparting to said ring a partial rotary movement in opposite directions, and tripping mechanism for the ring actuating means operatable only when a pin bar is in proper position in the ring to be actuated thereby.

11. In apparatus for making capsules, a drier, movable bars having capsule mold pins disposed therein in a single row, means for conveying said bars through the lower part of said drier with their pins in a vertical position, an upper conveyer, and means for elevating said bars consecutively to said upper conveyer and maintaining the pins thereof in a vertical position during said operation.

In testimony whereof, I sign this specification in the presence of two witnesses.

BURTON W. SCOTT.

Witnesses:
E. S. WHEELER,
I. G. HOWLETT.